US012632616B2

(12) United States Patent
Gupta et al.

(10) Patent No.: US 12,632,616 B2
(45) Date of Patent: May 19, 2026

(54) ELECTRIC GRID CONNECTION MAPPING

(71) Applicant: X Development LLC, Mountain View, CA (US)

(72) Inventors: Ananya Gupta, San Francisco, CA (US); Phillip Ellsworth Stahlfeld, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 844 days.

(21) Appl. No.: 17/955,857

(22) Filed: Sep. 29, 2022

(65) Prior Publication Data

US 2024/0110964 A1     Apr. 4, 2024

(51) Int. Cl.
*G06F 30/18*          (2020.01)
*G01R 31/08*          (2020.01)
(Continued)

(52) U.S. Cl.
CPC ........... *G06F 30/18* (2020.01); *G01R 31/086* (2013.01); *H02J 13/0001* (2020.01); *G06F 2113/04* (2020.01)

(58) Field of Classification Search
CPC ... G06F 30/18; G06F 2113/04; G01R 31/086; H02J 13/0001; H02J 2203/20
See application file for complete search history.

(56) References Cited

U.S. PATENT DOCUMENTS

2010/0217577 A1 *  8/2010  Korobkov ............. G06F 30/367
703/18

2013/0035885 A1 *  2/2013  Sharon ................... G06F 30/18
703/13
(Continued)

FOREIGN PATENT DOCUMENTS

| EP | 3664241 | 6/2020 |
| JP | 2022500998 | 1/2022 |
| WO | WO 2022/055731 | 3/2022 |

OTHER PUBLICATIONS

Barzel et al. "Network link prediction by global silencing of indirect correlations" Nature Biotechnology, 31, pp. 720-725 [retrieved from https://www.nature.com/articles/nbt.2601]. (Year: 2013).*

(Continued)

*Primary Examiner* — Brian W Wathen
(74) *Attorney, Agent, or Firm* — Fish & Richardson P.C.

(57) ABSTRACT

Methods, systems, and apparatus, including computer programs encoded on computer storage media, for developing electrical grid mapping. One of the methods includes obtaining a computer model of an electric power grid; generating a network graph representation of the computer model, wherein nodes of the network graph represent grid assets of the computer model and edges of the network graph represent wires connecting the grid assets; generating an initial prediction of links between nodes in the network graph by adding at least one edge to the network graph to obtain an over-connected graph; applying the over-connected network graph as input to a machine learning model to obtain an annotated network graph, the machine learning model configured to identify edges as positive links and negative links, and apply annotations to the edges indicating whether each edge is a positive or negative link; and updating the model based on the annotated network graph.

20 Claims, 7 Drawing Sheets

(51) Int. Cl.
    *H02J 13/00*         (2006.01)
    *G06F 113/04*       (2020.01)

(56)             References Cited

U.S. PATENT DOCUMENTS

| | | | |
|---|---|---|---|
| 2021/0406537 A1 | 12/2021 | Gupta et al. | |
| 2022/0170976 A1 | 6/2022 | Ringsquandl et al. | |
| 2022/0268827 A1* | 8/2022 | Sun | G01R 31/52 |
| 2022/0285982 A1* | 9/2022 | Dam | H02J 13/00007 |
| 2023/0018575 A1* | 1/2023 | Yubo | G06N 3/045 |
| 2023/0074995 A1* | 3/2023 | Lee | H02J 3/50 |

OTHER PUBLICATIONS

Liao et al., "Urban MV and LV Distribution Grid Topology Estimation via Group Lasso" IEEE Transactions on Power Systems, vol. 34, No. 1, Jan. 2019, pp. 12-27 [retrieved from https://ieeexplore.ieee.org/stamp/stamp.jsp?tp=&arnumber=8456535&tag=1]. (Year: 2019).*

Jayadev et al., "Identifying Topology of Power Distribution Networks Based on Smart Meter Data", Sep. 2016, pp. 1-8 [retrieved from https://arxiv.org/abs/1609.02678]. (Year: 2016).*

Thor et al., "Link Prediction for Annotation Graphs Using Graph Summarization" The Semantic Web ISWC 2011, pp. 714-729 [retrieved from https://link.springer.com/chapter/10.1007/978-3-642-25073-6_45]. (Year: 2011).*

International Preliminary Report on Patentability in International Appln. No. PCT/US2023/030152, mailed on Mar. 1, 2025, 5 pages.

International Search Report and Written Opinion in International Appln. No. PCT/US2023/030152, mailed on Nov. 29, 2023, 8 pages.

Sanchez-Lengeling et al., "A Gentle Introduction to Graph Neural Networks," Distill, Sep. 2, 2021, retrieved on Dec. 6, 2023, retrieved from URL<https://distill.pub/2021/gnn-intro/>, 31 pages.

Zhang et al., "Link Prediction Based on Graph Neural Networks," CoRR, Submitted on Nov. 20, 2018, arXiv:1802.09691v3, 17 pages.

Notice of Acceptance in Australian Appln. No. 2023353024, mailed on Mar. 18, 2026, 3 pages.

Office Action in Australian Appln. No. 2023353024, mailed on Feb. 4, 2026, 3 pages.

* cited by examiner

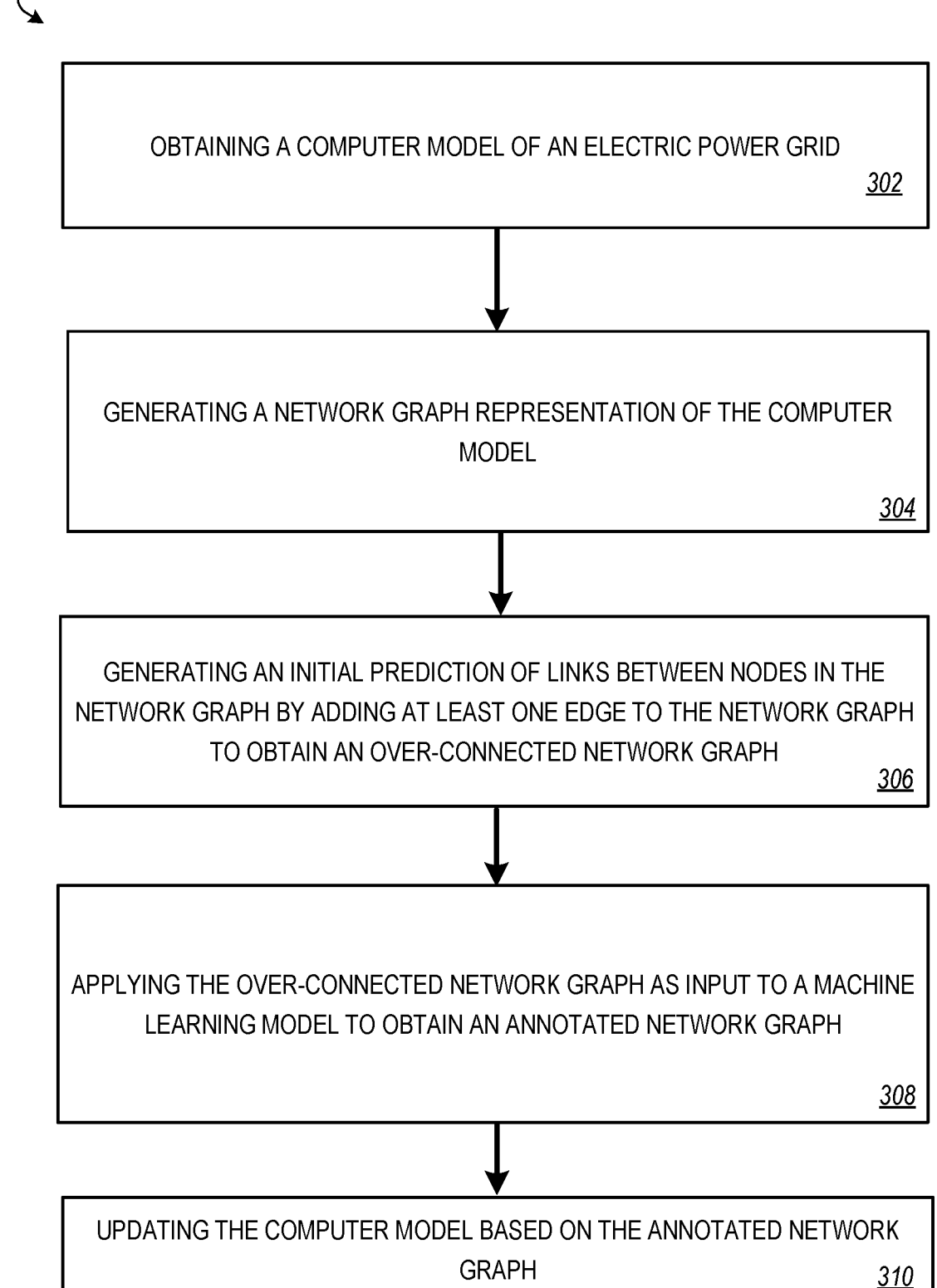

300

OBTAINING A COMPUTER MODEL OF AN ELECTRIC POWER GRID

302

GENERATING A NETWORK GRAPH REPRESENTATION OF THE COMPUTER MODEL

304

GENERATING AN INITIAL PREDICTION OF LINKS BETWEEN NODES IN THE NETWORK GRAPH BY ADDING AT LEAST ONE EDGE TO THE NETWORK GRAPH TO OBTAIN AN OVER-CONNECTED NETWORK GRAPH

306

APPLYING THE OVER-CONNECTED NETWORK GRAPH AS INPUT TO A MACHINE LEARNING MODEL TO OBTAIN AN ANNOTATED NETWORK GRAPH

308

UPDATING THE COMPUTER MODEL BASED ON THE ANNOTATED NETWORK GRAPH

ELECTRIC GRID CONNECTION MAPPING

TECHNICAL FIELD

The present specification relates to electrical power grids, and specifically to generating models of electrical power grids.

BACKGROUND

Electrical power grids transmit electrical power to loads such as residential and commercial buildings. Electric grid models are used to evaluate and predict operations and potential faults in an electric grid. However, some electric grid models are incomplete or inaccurate. For example, models often provide an incomplete representation of electric wire connections between electrical components in the grid because they are built from incomplete data. Present approaches for modeling electric grids can use overhead or street-level imaging to map the grid. In such approaches power lines that are obscured by vegetation, buildings, and bridges may not be represented in the model. Underground power lines also may not be represented in such data. Therefore, obscured connections between electrical nodes and loads can be particularly challenging to accurately map.

SUMMARY

In general, the present disclosure relates to building and verifying models of electrical distribution systems without relying on or to supplement data from grid operators.

In general, innovative aspects of the subject matter described in this specification can be embodied in methods that include the actions of obtaining a computer model of an electric power grid; generating a network graph representation of the computer model, wherein nodes of the network graph represent electric grid assets of the computer model and edges of the network graph represent wires connecting the electric grid assets; generating an initial prediction of links between nodes in the network graph by adding at least one edge to the network graph to obtain an over-connected network graph; applying the over-connected network graph as input to a machine learning model to obtain an annotated network graph, the machine learning model configured to identify edges as positive links and negative links, and apply annotations to the edges indicating whether each edge is a positive or a negative link; and updating the computer model based on the annotated network graph. Other implementations of this aspect include corresponding systems, apparatus, and computer programs, configured to perform the actions of the methods, encoded on computer storage devices.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, generating a network graph representation includes isolating a single feeder from a power grid network and generating the network graph representation of only the single feeder In some implementations, generating an initial prediction of links between nodes includes identifying respective pairs of nodes that are within a threshold distance from each other; and adding an edge between each respective pair of nodes.

In some implementations, a value of the threshold distance is based on auxiliary data including local electrical codes.

In some implementations, generating a network graph representation of the computer model includes converting computer model representations of electric grid assets into network graph nodes and converting computer model representations of connections between grid assets into network graph edges between respective nodes.

In some implementations, the electrical grid assets include at least one of a transformer, a switch, a relay, a capacitor, a power source, or an electrical load. In some implementations, the machine learning model is a graph neural network.

In some implementations, the machine learning model is configured to weight identification of the positive link annotations greater than identification of negative link annotations, as input to a log-loss function.

In some implementations, updating the computer model based on the annotated network graph includes: identifying at least one positive link between two nodes of the annotated network graph for which there is no corresponding connection between two electric grid assets in the computer model that correspond with the two nodes; and adding a representation of a connection between the two electric grid assets in the computer model.

Particular implementations of the subject matter described in this specification can be implemented so as to realize one or more of the following advantages. Implementations may improve electric grid upgrade planning, improve electric grid theoretical testing, and improve the creation of electric grid models efficiently and at scale.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

FIG. 3 is a flow diagram of the system.

DETAILED DESCRIPTION

Figure 1:
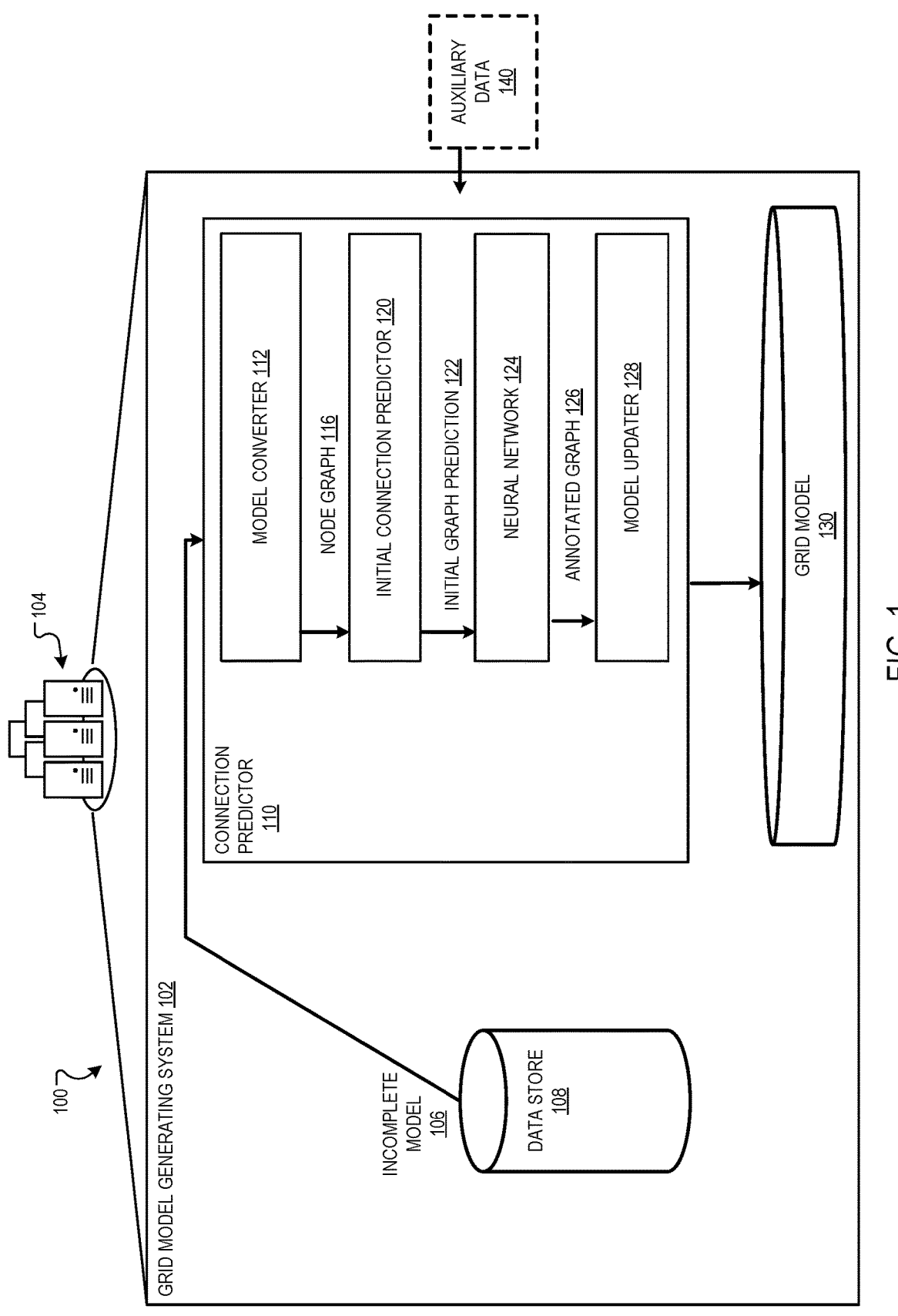
FIG. 1 is a diagram of an example system for predicting connections in an electrical power grid model given an incomplete model.

Electrical power grids are interconnected networks of power sources, power loads, and power delivery and regulating components. One example process for building models of electric grids involves identifying the location and interconnection of grid components (e.g., busses, transformers, switches, capacitors, voltage regulators, poles, wires, etc.) from aerial and StreetView imagery and LiDAR data, or public records and build the graphs that constitute these feeders. However, data obtained from such sources is often incomplete. Public records can be inaccurate, and imagery data of wires can be occluded (e.g., by vegetation and buildings). The present disclosure provides a process for estimating power line connections within an electrical grid by means of feeder graphs. An electric power grid (or portion thereof) is represented as a network graph. Then a graph neural network is used to predict and/or verify the location of feeder or wire connections between nodes in the graph. The processes and techniques of the present disclosure can overcome the issues of occlusions and gaps in wires in electric grid models developed through other means, such as the use of imagery data, by identifying/predicting the location of missing wires.

The present disclosure relates processes for building and verifying models of electrical distribution systems without relying on or to supplement data from grid operators. For example, the process is able to, given known nodes (e.g., transformers, capacitors, switches, voltage regulators, and/or utility poles), identify the connection pattern between the nodes. Electric grid components such as poles, substations, relays, transformers, or any other component that connects to one or more wires and/or supports one or more wires can be represented as nodes in a network graph. The nodes can have attributes based on what components are associated with the connection point. For example, node attributes can include, but are not limited to, geographic location of the node (e.g., the location of the corresponding physical component), node identification, and type of component represented by the node. The edges represent known wire connections between the nodes. Based on this information, the graph neural network is able to generate a solution of how the nodes are connected that closely matches reality.

The processes and techniques described herein can be executed by a modeling system or a model verification system. The modeling system obtains a network graph representation of a portion of an electric grid, such as described above. The system generates an initial prediction of links between nodes in the graph. In other words, the system generates a coarse estimate of all electric grid components (e.g., busses, transformers, switches, capacitors, voltage regulators, poles) that could potentially be connected by a wire. The coarse estimate can be, for example, based on a distance threshold between pairs of nodes in the network graph. The system then adds edges between any nodes of the network graph where a link is predicted, and where an edge does not yet exist in the network graph. In other words, the system produces an "over-connected" representation of the grid.

The network graph with the link predictions is provided as input to a trained graph neural network. The graph neural network is trained to identify which of the predicted links are likely accurate and which are not. The output of the graph neural network identifies the added links as either positive (likely an accurate wire connection) and negative links (likely an inaccurate wire connection). Once the negative and positive links are identified, the model of the electric grid can be updated to include wires between nodes where positive edges are indicated in the network graph.

Some implementations include one "central node" and its geospatial neighbors. The feeder context is removed by removing all nodes that were not in proximity of each central node. Links are generated as previously, positive links for the nodes that are connected to the central node, negative links otherwise and the model predicts a boolean for every such link. This can also be thought of as predicting pairwise connectivity without the graphical context.

Some implementations of partitioning use a central node, but instead of having positive links to nodes that it is directly connected to, having positive links for every node that has the same feeder. Partitioning could then be done by majority voting of the predicted links. This process works well for nodes that are surrounded by nodes of the same feeder.

Some implementations involve using power line predictions from overhead imagery as initial guesses for links and then training the model to iteratively improve the predicted links. This involves using the overhead imagery identified poles as nodes. These images provide the geographic known areas of nodes, from which the distances between nodes can be calculated. Again, an over-connected graph is generated as the system adds edges between any nodes of the network graph where a link is predicted, and where an edge does not yet exist in the network graph.

Some implementations involve generating a graph traversal from the electrical loads to the substation. This works backwards such that, for every node, the system predicts the node that supplies it. There should only be one node in this case as compared to multiple when going from substation to loads and one could use a soft max to predict the most likely source link. This would require updating the graph during training. This would also assume the feeder traversal process to be Markovian, in other words the next node in a feeder is only dependent on the previous step and not all the nodes before it.

Some implementations involve using the pole locations as nodes instead of buses. Since some of the poles are marked as support structures they do not always intersect lines. The process would require preprocessing the data in order to snap the poles to lines and generate segments between poles for the dataset. Some poles are not electrical (could be lights) and could be ignored. Some lines are underground and show up in the data but have no poles.

Some implementations involve setting up the problem as a heterogeneous graph learning problem where the nodes are one of the following: transformer, capacitor, switch, fuse etc. The edges could be "bus edges" to connect everything on the same bus—effectively a connection point in geometric graph terms or "line edges" which would be lines between buses. In this case the graph would again be set up as a link prediction problem. Heterogeneous graph learning is a slightly harder modeling problem, the models can be more expressive but then this also requires more data to train.

Some implementations can introduce additional data sets based on regional data. Additional data allows the model to be refined more accurately. For example, state enforced electrical codes mandate certain structural and component requirements for the distribution system. There can be limitations can the number of connections, the distance of connections. These data sets can add to the node characteristics. These nodes can then follow the same process of connection through link prediction.

Some implementations involve applying this system to map other utilities in the area based on connection points. For example, water and sewage connections can be predicted based on the location of lift stations, treatment facilities, service connections, fire hydrants, etc. These embodiments can use additional data sets based on equipment limitations, regional data, or both. For example, there can be limits on the distance or pressure that a lift station can achieve. This information factors into the connection likelihood of components within the model.

FIG. 1 is a diagram of an example system 100 for predicting connections in an electrical power grid model given an incomplete model. The system can use a group of one or more servers 104 to execute operations of a grid model generating system 102. This system can take incomplete models 106 of an electric grid and convert them into node graphs 116. The node graphs 116 can then processed through a neural network 124 in order to provide a completed representation of an electric grid model 130.

The system can include, but is not limited to, one or more data stores 108, and operation modules 110, 112, 120, 124, 128. The operation modules can include a grid model generating system 102, incomplete model source 108, connection predictor 110, model converter 112, initial connection predictor 120, neural network 124, model updater 128, and grid model 130. In some implementations, the operation modules also include a feeder partitioner (not shown). In some implementations, auxiliary data 140, or other supplementing information used in generating the completed models. The auxiliary data 140 can be supplied as input to the connection predictor 110 or other operation modules.

The operation modules 110, 112, 120, 124, 128 can be provided as one or more computer executable software modules, hardware modules, or a combination thereof. For example, one or more of the operation modules 110, 112, 120, 124, 128 can be implemented as blocks of software code with instructions that cause one or more processors of the servers 104 to execute operations described herein. In addition or alternatively, one or more of the operation modules 110, 112, 120, 124, 128 can be implemented in electronic circuitry such as, e.g., programmable logic circuits, field programmable logic arrays (FPGA), or application specific integrated circuits (ASIC).

Data store 108 can include a repository of incomplete electric grid models 106. For example, the incomplete models 106 can be derived from several different sources to ingest the basic components that can be necessary to generate a representation of the grid. The data store 108 can include geospatial data, city data, maps, manual input, or otherwise. The data store 108 can be industry standard representations of the models, future planned expansions, historical records, manually created representations, or more. The data store 108 can be created through automatic searching, manual input, periodic backups, database conglomeration, or various other data harvesting sources. These several different sources can stand alone or combine to represent the incomplete model 106.

In some implementations, the data store 108 can be any suitable storage mechanisms such as a file system, repository, and/or relational databases. The data store 108 can store Machine Learning (ML) models and can store metadata associated with ML models such as a version number, creation date, owner, access control lists and so on. The data store 108 can be physically present in the grid model generating system 102 or coupled to a separate central server system by one or more networks.

Incomplete model 106 represents a model of an electric grid or a portion thereof. However, the incomplete model 106 can have gaps in data that differ from the layout of a corresponding physical electric grid. For example, an aerial image of a neighborhood can show some power lines clearly connected to some houses. However, some power lines are obscured by foliage or other objects. Some power lines are buried and not visible to the aerial imagery. Thus, electric grid models built from such data are incomplete, in that they do not include the obscured or underground power lines.

In some embodiments the incomplete model 106 can be generated based on a combination of aerial imagery and city maps. They can include representations of the electric grid based on power company operations. These incomplete models 106 are partially complete or do not show full grid integration, e.g., because wire connections between some components are missing. For example, an upgraded component in the transmission system was not updated on the map of the system when installed. Or after a hurricane, repairs were done to the grid that are not fully documented in the power company's map of the electric grid. The model converter 112 receives the incomplete model 106 from the data store 108.

Figure 2A:
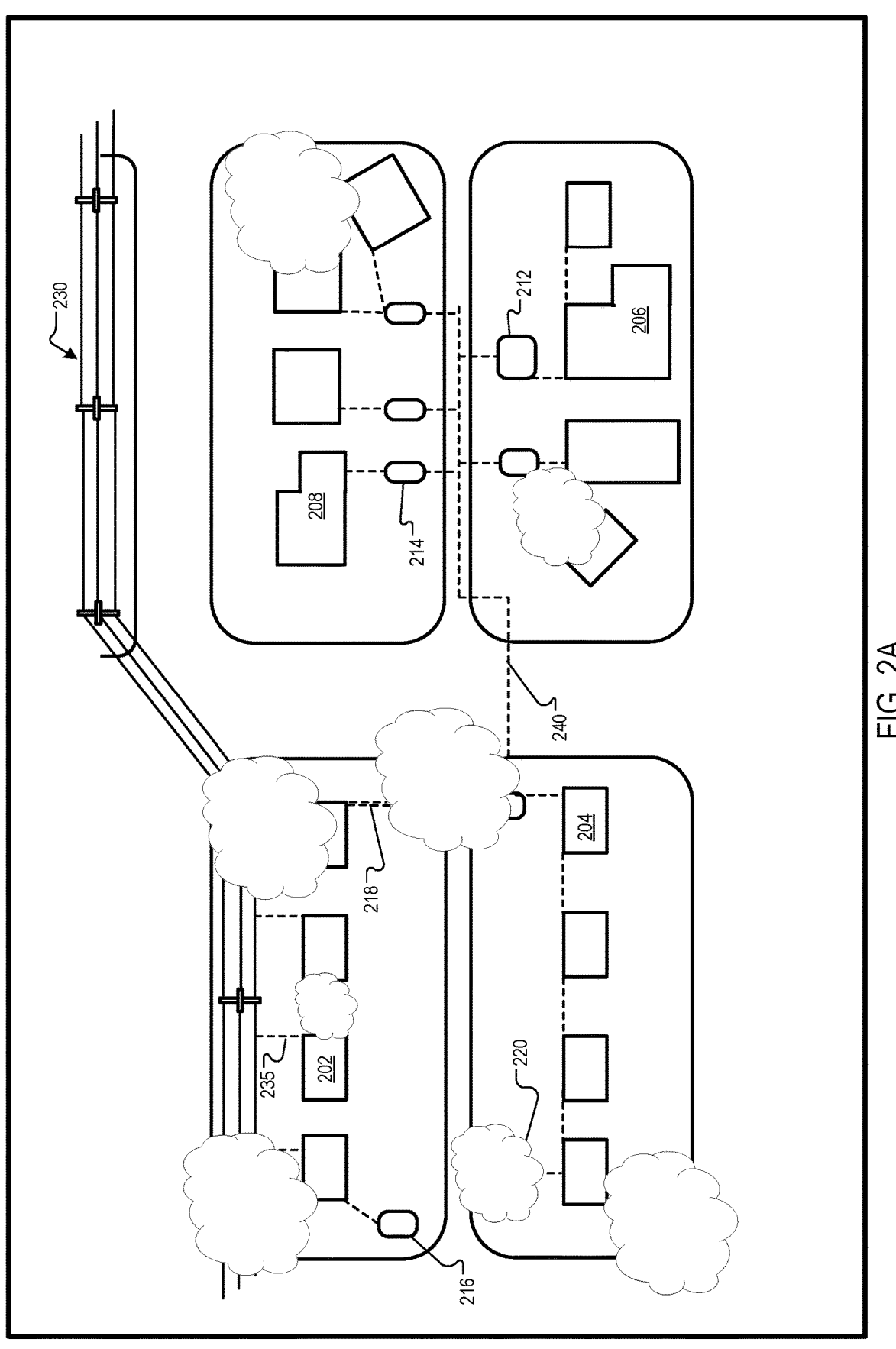
FIG. 2A is a diagram of an example overhead image of a neighborhood and the electrical connections between components
Figure 2B:
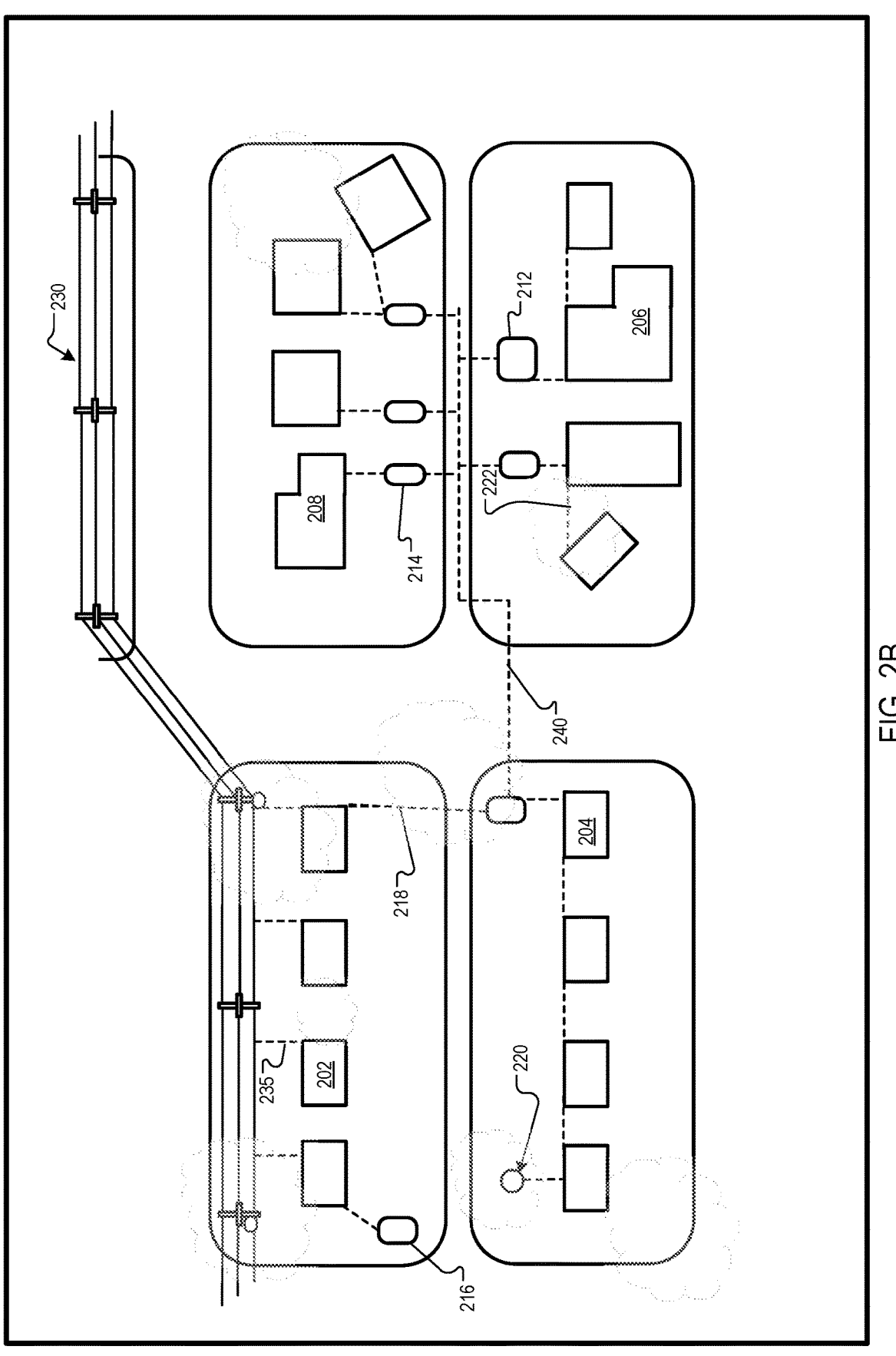
FIG. 2B is a diagram of an example overhead image of a neighborhood and the electrical connections between components with the visual obstructions removed.

For example, FIGS. 2A and 2B illustrate how electric grid models based on imagery data can be incomplete. FIG. 2A illustrates an example of an aerial diagram of a portion of an electric grid. FIG. 2B is the same an aerial diagram in FIG. 2A but with the obfuscations removed. These diagrams represents houses such as 202, 204, 206, 208 and grid components 212, 214, 216, 218, 220 such as transformers, load balancers, etc. The main power lines 230 bring power to the neighborhood, and split of to individual lines such as power line 235 to house 202.

In cases, grid components or interconnections (power lines) are obfuscated by objects such as trees, such as power line 218 and power line 222 (visible only in FIG. 2B. Electric grid interconnections (power lines) may also be obscured in imagery data when the power lines are routed underground. FIG. 2B does not represent actual imagery data that may be used to generate an electric grid model, but does reveals the actual connections of the electric grid that are obscured FIG. 2A.

A modeling system can process imagery data of the electric grid (such as the diagram in FIG. 2A) and produce a rough or partially connected model of the electric grid. Such a model represents an incomplete model 106 of the electric grid because some interconnections may be missing (e.g., power lines 218 and 222). As discuss below, the connection predictor 110 can fill in the gaps of the incomplete model 106 to predict the location of power lines such as lines 218 and 222. Thus, the final output of the connection predictor 110 is a model that more closely approximates the unobscured grid diagram of FIG. 2B. This final output is a completed grid representation showing all components and their interconnections.

In one implementation a connection predictor 110 contains processes for the electric grid connection prediction. Connection predictor 110 can obtain incomplete models 106 from data store 108. For example, the connection predictor 110 can receive the data through manual input, automatic backups, manual search or initiation, automatic search, scheduled activity, or various combinations of these. The feeder connection predictor 110 can include a model converter 112, initial connection predictor 120, neural network 124, model updater 128, and grid model 130. In some implementations a connection predictor 110 can include some, all, or a partial combination of these components. The connection predictor 110 receives the incomplete model 106 and outputs a grid model 130.

Figure 2C:
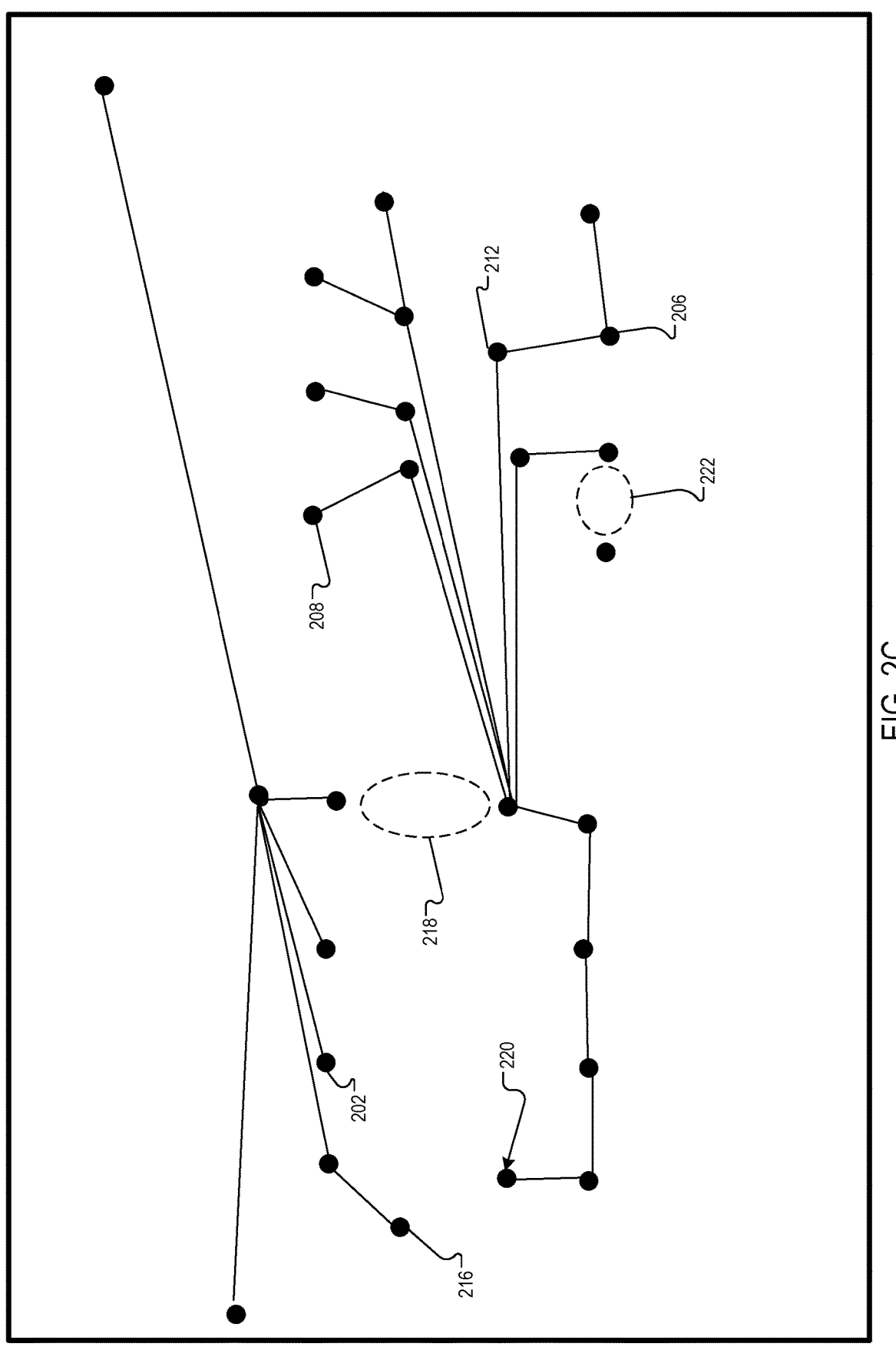
FIG. 2C is an example of the node graph that represents the real world grid model that is represented in FIG. 2B.

The model converter 112 receives the incomplete model 106 and produces a node graph 116 representation of the model 106. The node graph 116 is a graphical representation of the actual grid. The graphical representation represents components of the system as nodes and inter connections between nodes (e.g., power lines/wires) as edges. The graphical representation does not visually represent distances between nodes or physical scale. For example, a model file of a neighborhood (e.g., the neighborhood shown in FIG. 2A) with several houses, transformers, and other components is converted into various nodes. Each node represents a component from the aerial image to which wires or power lines are or should be connected. For example, the houses, transformers, substations, and any other electrical load or generator in the aerial image is represented in a node. The connecting wires between components become the edges of the node graph 116. FIG. 2C is an example of the node graph 116. The model converter 112 converts the electrical components of the incomplete model 106 into nodes and represents the power lines as edges. Note that power lines 218 and 222 are missing from the node graph 116 (as indicated by dashed ovals 218a and 222a. Note also that known or existing node connections are represented by solid lines in the node graph depicted in FIG. 2C.

The node graph 116 (FIG. 2C) is the graph network representation of the incomplete model 106 made up of nodes representing components of the grid. The edges between nodes represent the power line connections between components. At this point the node graph 116 is still a partial representation of the electric grid, in that some connections between nodes can be missing because they were occluded in visual images or missing from source data (maps, models, or otherwise) used to generate the model 106.

The model converter 112 can convert additional data representing how the nodes are connected into the nodes of node graph 116. For example, can store additional data such as electric component properties or power line properties as metadata associated with each node and/or edge. Such metadata can include, but is not limited, to geographic locations of each component, the type of electrical component, power characteristics, relative distances between nodes, length of power lines, characteristics of the power lines (e.g., gauge wire used, voltage, current ratings), or a combination thereof.

For example, when converting model data, the model converter 112 can recognize certain components and upload data associated with those components. The data associated with the components can represent physical limitations of the components. For example, if the model converter 112 recognizes the manufacturer, make, model, or a combination thereof, of a transformer from the data, it can upload information about the limits and capabilities of that transformer into the node data for the graph. The data that is loaded into the nodes can come from multiple data sources or can be included as data within the incomplete model 106. The synthesis of the data produces the attributes of the nodes within node graph 116.

In some implementations, the nodes are also missing from the source data. For example, cleanup efforts after a natural disaster involved upgrading several components in the electric grid and installing redundant transformers. However, the redundant transformers are not documented on the electric company's maps of the grid. In another example, an aerial image can obscure a ground based transformer from view, or the local community has planted bushes around it to make the area visually appealing. In these situations, the node graph 116 can be missing connections and nodes.

In some implementations, the node graph 116 stores information about each node. For example, each node can be associated with metadata that represents attributes of the electric grid component represented by the node. The metadata can include, but is not limited to, equipment ratings, load ratings, capacities, resistances, load characteristics, loss characteristics, efficiencies, limitations, performance characteristics, or a combination thereof. This information can be utilized in constraining assumptions about connections between nodes.

The initial connection predictor 120 receives the node graph 116 and outputs an initial graph prediction 122. Existing connections between nodes shown in FIG. 2C are assumed/known to be true from that data used to create the incomplete model 106. However, the node graph 116 is likely missing connections between nodes that were not identifiable from the source data used to create the incomplete model 106.

Figure 2D:
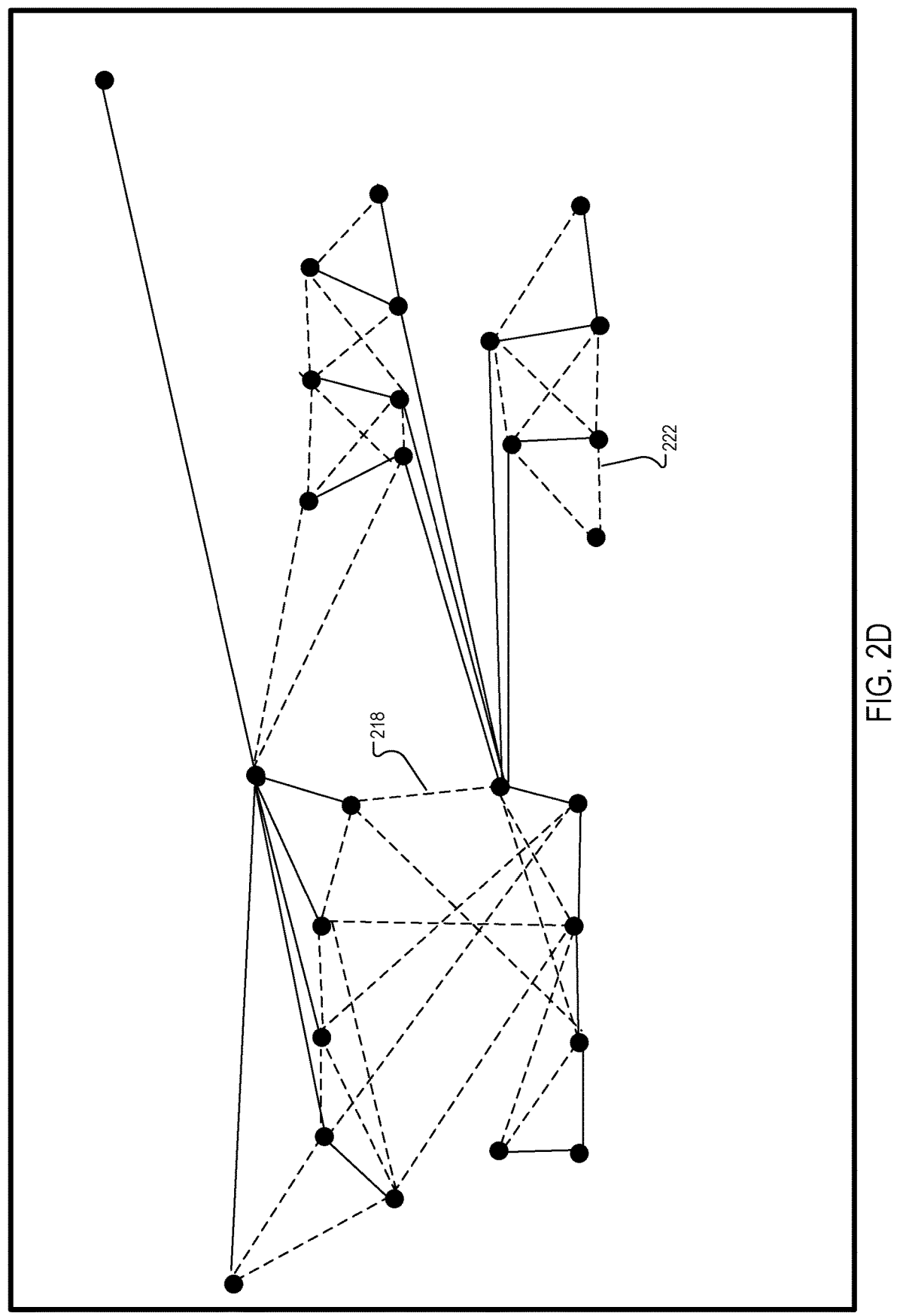
FIG. 2D is an example of an over connected node graph.

The initial connection predictor 120 creates a graph network that is over connected FIG. 2D. FIG. 2D is an example of the initial graph prediction 122. The connection predictor 120 added an excess amount of prediction connections (shown as dashed edges) to the node graph 116. Some of the connections are true, but more of them are false. As the system analyzes the graph, the false connections are weighted less, since the system anticipates more false connection, then positive connection. Note that in FIG. 2D power lines 218 and 222 are added to over connected node graph (e.g., the initial graph prediction 122) as predicted connections (dashed edges).

This over connected graph network is the initial graph prediction 122. The initial connection predictor 120 uses information about the nodes to determine where to place the predicted connections. The initial graph prediction 122 contains some ground truth data about connections between the nodes. Many of the connections in the initial graph prediction 122 are wrong. In the initial graph prediction 122 there are more incorrect connections than correct connections. In some implementations, the initial connection predictor 120 can use the metadata associated with the nodes and edges of the node graph 116 and/or auxiliary data 140 limit the total number of predicted connections created and/or to inform the connection criteria between nodes. For example, the initial connection predictor 120 can use auxiliary data 140 such as electric codes associated with a specific geographic region of the electric grid model (e.g., local, state, or federal electric codes) to inform edge predictions.

In some implementations, there can be additional constraints that factor into the initial connection predictor 120 from various sources. For example, the electrical feeder information can be used to constrain the data set and limit the distance or number of connections. Another example of constraint data can be the physical distance between components. The data representing the distance can, but is not required to be physically represented in the node graph 116, but can be represented in the information stored in the nodes. The node data imported or converted by the model converter 112 can provide further constraints on the limits or capabilities of the nodes and provide contextual data that enables production of the initial graph prediction 122.

The initial connection predictor can set general criteria to limit the number of initially predicted connections. For example, the initial connection predictor 120 can use metadata associated with existing nodes and edges, auxiliary data 140, or both to set thresholds that limit the number of predicted connections. The initial connection predictor 120 can set a maximum connection distance between nodes. A prediction connection will only be added between unconnected nodes that are separated by a distance less than the maximum connection distance. In some implementations, the maximum connection distance can be set based on attributes of nodes being connected. For example, a maximum connection distance may be shorter for nodes that operate at a lower voltage than for nodes that operate at a higher voltage. The initial connection predictor 120 passes the initial graph prediction 122 to the neural network 124

Figure 2E:
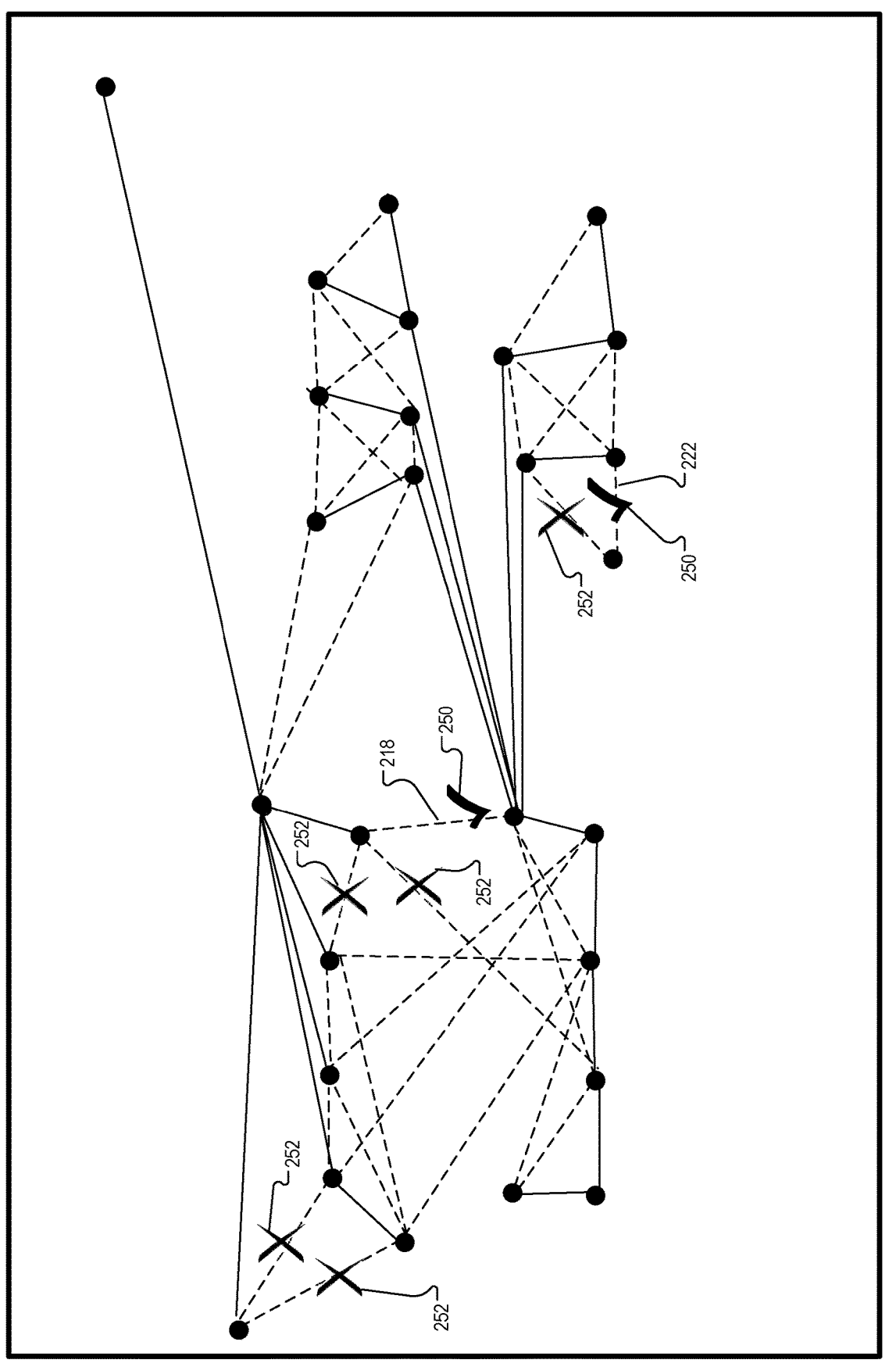
FIG. 2E depicts an example of an annotated graph.

The neural network 124 receives the initial graph prediction 122 and analyzes the connections between nodes. The neural network 124 determines which predicted connections are the positive or true connections and which are the negative or false connections. The neural network 124 then adds annotations to the initial graph prediction 122 to provide an annotated graph 126. The neural network then outputs an annotated graph 126. FIG. 2E depicts an example of an annotated graph 126. Positive annotations 250 are indicated in the figure by "check marks" and the negative annotations 252 are indicated by "x's." Note that power lines 218 and 222 are annotated as true connections (e.g., with positive annotations 250), while other predicted edges are annotated with negative annotations 252. In practice many more predicted connections would have negative annotations 252, however only a few are illustrated in FIG. 2E to avoid over complicating the figure.

The annotated graph 126 is the initial graph prediction 122 with annotations on all the connections. The annotations denote correct or incorrect connections between nodes. These connections represent the wires or power lines connecting the nodes. The nodes represent the physical components within the electric grid. At this point, the graph network is a representation of the electric grid, its components, and the connections between the components.

In some implementations, the system can weigh the positives annotations 250 differently than the negatives annotations 252 in calculating the results. For example, in the over connected network, the system knows there are more negatives than positives. Therefore, the system weights the positive returns higher or more than the negatives.

In some implementations, the system can also weight using a log loss function or standard form. This method can utilize higher numbers or values on possible links. This method can also adjust the weighting factors through a training process or in real time. A training process can be used to average out or reduce error. With the annotated graph 126, the model updater 128 can update the original incomplete model 106.

In some examples, the neural network 124 employs the metadata associated with the known nodes and edges to inform decisions on which predicted connections are true and which are false. For instance, the metadata may indicate that a connection prediction is between two loads (e.g., houses). The neural network 124 can be trained to recognize that loads are not connected in series, and therefore, mark such a with a negative annotation. In some examples, the neural network can employ auxiliary data to inform decisions on which predicted connections are true and which are false. For instance, an electric code may set a maximum number of loads that may be connected to a transformer. The connection predictor 120 can identify a particular node as a transformer based on metadata associated with the node and limit the number of total connections (e.g., existing and predicted connections) extending from the transformer node to load nodes. For example, if the transformers with a particular rating are limited to feeding five total loads and the transformer node has four known connections to loads, the neural network can be trained to recognize that such a transformer can only have one additional connection to a load and annotate the network graph accordingly.

In some implementations, a training system is used to train the neural network 124 against a ground truth graph of the electric grid. Errors in the computation are measured against the ground truth graph of the electric grid. The error is the delta or difference between the output of the system and the ground truth graph of the electric grid. This error can be used to feed back into weighting systems and average out or reduce errors in output.

The model updater 128 takes annotated graph 126 and produces the grid model 130. The model updater 128 uses the annotations of the annotated graph 126 to systematically update the incomplete model 106. The nodes are converted back into components. Every false connection is removed and every positive connection is retained. The grid model 130 is a complete representation of all components and the connections between those components. The outputted grid model 130 is the physical representation of the complete grid model.

FIG. 3 is a flow diagram of an example process 300 for updating incomplete electric power grid models with predicted electrical connections between components. Process 300 can be executed by one or more computing systems including, but not limited to, the grid model generating system 102 and servers 104, described above. In some implementations, the process 300 can be executed by machine learning, artificial intelligence, distributed computing, cloud computing, neural networks, or other conglomerate computing processes.

In general, the process 300 includes receiving a partial or incomplete grid model 106, converting that grid model 106 into a node graph 116, producing an initial graph prediction 122, determining the correct connections and annotating the annotated graph 126, and finally updating the grid model 130 according to the annotations. In some implementations, a grid model generating system 102 oversees the process 300. The grid model generating system 102 can manage the data store 108, the connection predictor 110 processes, and the completed grid model 130 storage. The grid model generating system 102 can use auxiliary data 140 in processing the grid model 130.

A system obtains a computer model of an electric power grid 302. The system can obtain the computer model from a local database or the computer model can be uploaded to the system from an external source. For example, the computer model may be incomplete. That is the computer model may be missing some connections between electric grid components. For example, a computer model can be generated from imagery data in which some power lines are obscured or otherwise not visible, from incomplete records, or from old, un-updated records of the electric grid. In such situations, the some interconnections between electric grid components or grid components themselves may be missing from the computer model.

The system generates a network graph representation of the computer model 304. For example, the system converts model representations of electric grid components into nodes within the network graph. The system represents connections between components (e.g., power lines) as edges in the network graph. In some implementations, the system can incorporate characteristics of individual electric grid components and power lines as metadata associated with individual nodes or edges. Such metadata annotations can include, but are not limited to, component identifications (e.g., load, transformer, switch, inverter, etc.), power characteristics, operating voltages/currents, power line length, power line gauge, geographic location, or any combination thereof.

The system generates and initial prediction of links between nodes in the network graph by adding at least one edge to the network graph to obtain an over-connected network graph 306. For example, the system can add edges between any number of un-connected nodes to create a network graph that is over-connected. The over-connected graph is over-connected because it contains more edges than expected in the actual electric grid, or portion thereof, that the computer model represents. In other words, there are more predictions of connections (power lines) between grid components (nodes) than there are actual connections between components. This process produces an over connected graph as the initial graph prediction 122. In some implementations, the process of over connecting is constrained. For example, the system can apply some general constraints on which nodes should be connected. For example, nodes representing grid components that are beyond a threshold geographic distance between each other may not be connected. Stated differently, the system can limit predicted node connections to only nodes representing grid components that are within the threshold geographic distance. In such implementations, the system calculates distances between nodes based on metadata associated with each node in a pair.

The system applies the over-connected network graph as input to a machine learning model to obtain an annotated network graph 308. For example, the machine learning model can be a graph neural network trained to identify which of predicted connections within the over-connected graph are likely to be actual connections (power lines) in the real electric grid. Once identified, annotations that indicate which predicted links are the positive links (i.e., likely representative of an actual power line) and negative links (i.e., not likely representative of an actual power line) are added to the graph. The machine learning model can be trained to incorporate and make decisions using additional input data including, but not limited to, metadata associated with the nodes and links, geographic data, regional electrical codes, or a combination thereof.

The system updates the computer model based on the annotated network graph 310. For example, the system adds data representing predicted power lines to the computer model based on the links with positive annotations in the annotated network graph. For example, the system can identify an edges linking respective pairs of nodes that are annotated with positive annotations. The system compare each pair of nodes to the corresponding grid components within the computer model and determine that the original computer model did not represent a power line between the grid components that are represented by the pair of nodes. The system can then add a power line connection to the computer model between the two grid components.

In some implementations, the annotated network graph is used to generate a new computer model. For example, edges with negative annotations are removed from the network graph while the original (non-predicted edges) and edges with positive annotations are retained. The system can then convert the network graph back into a computer model of the electric grid. For example, the system can use the metadata associated with each node/edge and revert the network graph into a simulation file format compatible with the computer model. The result is a model 130 that shows all components within the defined section of the grid and all the connections between those components.

In some implementations, the system can identify individual electric grid feeders within the computer model. For example, the system can identify a group of electrical components that are generally connected along a single electrical feeder originating at a substation. The system can isolate the components from the rest of the electric grid model and generate the network graph using only those components along a single feeder. The resulting network graph, in such a case, would represent an individual feeder. In such implementations, the process 300 described above can be repeated for each feeder individually.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art.

For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. An electric power grid model verification method comprising:
   obtaining a computer model of an electric power grid;
   generating a network graph representation of the computer model, wherein nodes of the network graph represent electric grid assets of the computer model and edges of the network graph represent wires connecting the electric grid assets;
   generating an initial prediction of links between nodes in the network graph by adding at least one edge to the network graph to obtain an over-connected network graph;
   applying the over-connected network graph as input to a machine learning model to obtain an annotated network graph, the machine learning model configured to identify edges as positive links and negative links, and apply annotations to the edges indicating whether each edge is a positive or a negative link; and
   updating the computer model based on the annotated network graph.

2. The method of claim 1, wherein generating a network graph representation includes isolating a single feeder from a power grid network and generating the network graph representation of only the single feeder.

3. The method of claim 1, wherein generating an initial prediction of links between nodes comprises identifying respective pairs of nodes that are within a threshold distance from each other; and adding an edge between each respective pair of nodes.

4. The method of claim 3, wherein a value of the threshold distance is based on auxiliary data including local electrical codes.

5. The method of claim 1, wherein generating a network graph representation of the computer model comprises converting computer model representations of electric grid assets into network graph nodes and converting computer model representations of connections between grid assets into network graph edges between respective nodes.

6. The method of claim 1, wherein the electrical grid assets include at least one of a transformer, a switch, a relay, a capacitor, a power source, or an electrical load.

7. The method of claim 1, wherein the machine learning model is a graph neural network.

8. The method of claim 1, wherein the machine learning model is configured to weight identification of the positive link annotations greater than identification of negative link annotations, as input to a log-loss function.

9. The method of claim 1, wherein updating the computer model based on the annotated network graph comprises:
   identifying at least one positive link between two nodes of the annotated network graph for which there is no corresponding connection between two electric grid assets in the computer model that correspond with the two nodes; and
   adding a representation of a connection between the two electric grid assets in the computer model.

10. A non-transitory computer storage medium encoded with instructions that, when executed by one or more computers, cause the one or more computers to perform operations comprising
   obtaining a computer model of an electric power grid;
   generating a network graph representation of the computer model, wherein nodes of the network graph represent electric grid assets of the computer model and edges of the network graph represent wires connecting the electric grid assets;
   generating an initial prediction of links between nodes in the network graph by adding at least one edge to the network graph to obtain an over-connected network graph;
   applying the over-connected network graph as input to a machine learning model to obtain an annotated network graph, the machine learning model configured to identify edges as positive links and negative links, and apply annotations to the edges indicating whether each edge is a positive or a negative link; and
   updating the computer model based on the annotated network graph.

11. The computer storage medium of claim 10, wherein generating a network graph representation includes isolating a single feeder from a power grid network and generating the network graph representation of only the single feeder.

12. The computer storage medium of claim 10, wherein generating an initial prediction of links between nodes comprises identifying respective pairs of nodes that are within a threshold distance from each other; and adding an edge between each respective pair of nodes.

13. The computer storage medium of claim 12, wherein a value of the threshold distance is based on auxiliary data including local electrical codes.

14. The computer storage medium of claim 10, wherein generating a network graph representation of the computer model comprises converting computer model representations of electric grid assets into network graph nodes and converting computer model representations of connections between grid assets into network graph edges between respective nodes.

15. The computer storage medium of claim 10, wherein the electrical grid assets include at least one of a transformer, a switch, a relay, a capacitor, a power source, or an electrical load.

16. The computer storage medium of claim 10, wherein the machine learning model is a graph neural network.

17. The computer storage medium of claim 10, wherein the machine learning model is configured to weight identification of the positive link annotations greater than identification of negative link annotations, as input to a log-loss function.

18. The computer storage medium of claim 10, wherein updating the computer model based on the annotated network graph comprises:
   identifying at least one positive link between two nodes of the annotated network graph for which there is no corresponding connection between two electric grid assets in the computer model that correspond with the two nodes; and
   adding a representation of a connection between the two electric grid assets in the computer model.

19. A system comprising one or more computers and one or more storage devices on which are stored instructions that are operable, when executed by the one or more computers, to cause the one or more computers to perform operations comprising:
   obtaining a computer model of an electric power grid;
   generating a network graph representation of the computer model, wherein nodes of the network graph represent electric grid assets of the computer model and edges of the network graph represent wires connecting the electric grid assets;

generating an initial prediction of links between nodes in the network graph by adding at least one edge to the network graph to obtain an over-connected network graph;

applying the over-connected network graph as input to a machine learning model to obtain an annotated network graph, the machine learning model configured to identify edges as positive links and negative links, and apply annotations to the edges indicating whether each edge is a positive or a negative link; and updating the computer model based on the annotated network graph.

20. The system of claim 19, wherein updating the computer model based on the annotated network graph comprises:

identifying at least one positive link between two nodes of the annotated network graph for which there is no corresponding connection between two electric grid assets in the computer model that correspond with the two nodes; and adding a representation of a connection between the two electric grid assets in the computer model.

* * * * *